United States Patent
Sakikawa et al.

(10) Patent No.: US 9,355,162 B2
(45) Date of Patent: *May 31, 2016

(54) OPERATION ARRANGEMENT SUPPORT SYSTEM AND METHOD THEREOF

(71) Applicant: Hitachi, Ltd., Tokyo (JP)

(72) Inventors: Shuichiro Sakikawa, Mito (JP); Tatsuhiro Sato, Fujisawa (JP); Toyohisa Morita, Tokyo (JP); Hirotake Yoshida, Hitachioota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,892

(22) Filed: Jan. 9, 2015

(65) Prior Publication Data
US 2015/0120665 A1  Apr. 30, 2015

Related U.S. Application Data

(63) Continuation of application No. 13/740,897, filed on Jan. 14, 2013, now Pat. No. 8,954,382, which is a continuation of application No. 13/057,231, filed as application No. PCT/JP2009/002185 on May 18, 2009, now Pat. No. 8,364,632.

(30) Foreign Application Priority Data

Aug. 26, 2008 (JP) .................... 2008-216112

(51) Int. Cl.
G06F 17/30 (2006.01)
B61L 27/00 (2006.01)
(Continued)

(52) U.S. Cl.
CPC ....... *G06F 17/30575* (2013.01); *B61L 27/0027* (2013.01); *G06F 11/1469* (2013.01); *G06T 1/60* (2013.01)

(58) Field of Classification Search
USPC .......... 707/609, 649, 679; 701/24, 32.1, 32.2
See application file for complete search history.

(56) References Cited

U.S. PATENT DOCUMENTS 5,430,642 A   7/1995  Nakajima et al.
5,541,832 A   7/1996  Nakajima et al.
(Continued)

FOREIGN PATENT DOCUMENTS

JP    2004-224113    8/2004
JP    2007-179342    7/2007
(Continued)

OTHER PUBLICATIONS

PCT International Search Report on Application No. PCT/JP2009/002185 mailed Jun. 23, 2009; 2 pages.

*Primary Examiner* — Hanh Thai
(74) *Attorney, Agent, or Firm* — Foley & Lardner LLP

(57) ABSTRACT

An operation arrangement work is accelerated by improving efficiency of generating an operation arrangement proposal and confirming whether the operation arrangement proposal is good or not. An operation support system has an operation arrangement proposal generation part (1110) which executes automatic generation of an operation arrangement proposal, a diagram prediction part which executes simulation of train operation in the future, a diagram display part (1120) which displays an operation schedule and the operation arrangement proposal as a diagram, and a user input part which receives input of a parameter from the user. System has a snapshot restoration part (1130) which restores snapshots of the operation arrangement proposal in an automatic generation process on the basis of a diagram change history outputted by the operation arrangement proposal generation part (1110), and a snapshot display input part (1140) which displays to the user a snapshot according to input from the user.

9 Claims, 12 Drawing Sheets

(51) Int. Cl.
*G06F 11/14* (2006.01)
*G06T 1/60* (2006.01)

(56) References Cited

U.S. PATENT DOCUMENTS

| | | |
|---|---|---|
| 5,812,273 A | 9/1998 | Conley et al. |
| 5,841,652 A | 11/1998 | Sanchez |
| 5,930,136 A | 7/1999 | Nakajima et al. |
| 5,982,435 A | 11/1999 | Tong et al. |
| 6,097,500 A | 8/2000 | Fromherz |
| 6,126,450 A | 10/2000 | Mukai |
| 6,158,044 A * | 12/2000 | Tibbetts ............... G06F 9/4443 707/999.001 |
| 7,092,894 B1 | 8/2006 | Crone |
| 7,573,939 B2 | 8/2009 | Kondo |
| 2002/0146180 A1 | 10/2002 | Hirakoso |
| 2003/0061463 A1* | 3/2003 | Tibbetts ............... G06Q 10/10 712/1 |
| 2004/0006552 A1* | 1/2004 | Kakigi ................. G06F 3/1207 |
| 2004/0133315 A1 | 7/2004 | Kumar et al. |
| 2004/0189823 A1 | 9/2004 | Shibutani |
| 2005/0108085 A1* | 5/2005 | Dakar .................. G06Q 30/06 705/400 |
| 2005/0234757 A1 | 10/2005 | Matheson et al. |
| 2006/0017813 A1 | 1/2006 | Okubo et al. |
| 2006/0085278 A1* | 4/2006 | Shimoda ............... G06Q 30/02 705/26.1 |
| 2006/0253234 A1 | 11/2006 | Kane et al. |
| 2007/0001058 A1 | 1/2007 | Severson |
| 2007/0093243 A1* | 4/2007 | Kapadekar et al. ........... 455/419 |
| 2007/0132853 A1 | 6/2007 | Shiota et al. |
| 2007/0150677 A1 | 6/2007 | Homma et al. |
| 2007/0234834 A1 | 10/2007 | Gitt et al. |
| 2008/0097660 A1* | 4/2008 | Fukawa ................ G06Q 10/06 701/19 |
| 2008/0167927 A1 | 7/2008 | Barnard et al. |
| 2008/0215413 A1* | 9/2008 | Barnard et al. ..................... 705/9 |
| 2009/0165022 A1* | 6/2009 | Madsen et al. ................. 719/318 |
| 2009/0299555 A1 | 12/2009 | Houpt et al. |

FOREIGN PATENT DOCUMENTS

| | | |
|---|---|---|
| JP | 2007-314105 | 12/2007 |
| JP | 2008-189272 | 8/2008 |

* cited by examiner

FIG. 5

| ID | DIAGRAM CHANGE DETAILS | |
|---|---|---|
| 0020 | CHANGE DEPARTURE ORDER OF b1 TO PLACE BEFORE a1 AT STATION C | 5310 |
| 0021 | CHANGE TRACK OF b1 FROM x-TH TO y-TH AT STATION C | 5320 |
| 0022 | CHANGE ORDER OF c1 TO DEPART BEFORE f1 AT STATION E | |
| . | | |
| 0128 | CHANGE ORDER OF p1 TO DEPART BEFORE q1 AT STATION Z | |

OPERATION ARRANGEMENT SUPPORT SYSTEM AND METHOD THEREOF

CROSS-REFERENCE TO RELATED PATENT APPLICATIONS

Japan Priority Application 2008-216112, filed Aug. 26, 2008 including the specification, drawings, claims and abstract, is incorporated herein by reference in its entirety. This application is a Continuation of U.S. application Ser. No. 13/740,897, filed Jan. 14, 2013, incorporated herein by reference in its entirety, which is a Continuation of U.S. application Ser. No. 13/057,231 (National Stage of PCT/JP2009/002185), filed Apr. 12, 2011, incorporated herein by reference in its entirety.

TECHNICAL FIELD

The present invention relates to an operation arrangement support system for executing automatic generation of an arrangement proposal for restoring operation disruption in operation arrangement work.

Operation arrangement work for restoring an operation schedule when disruption occurs in train operation due to bad weather, vehicle failure, or the like is very complicated planning work requiring not only determination of physical conditions such as train travel speeds, shelter facility in stations, and the like but also all-aspects and broad-viewpoint determination in which the entire transport system including operation ratios of vehicles and occupants and services is considered. Consequently, a technique on automatization of operation arrangement for reducing burden on commanders who control the work and promoting advancement of technique has been developed (refer to patent document 1).

PRIOR ART DOCUMENT

Patent Document

Patent document 1: Japanese Unexamined Patent Application Publication 2004-224113

SUMMARY OF THE INVENTION

Problems to be Solved by the Invention

However, in the technique disclosed in the patent document 1, the user can see only a final result of an operation arrangement proposal which is automatically generated. The user can confirm whether the operation arrangement proposal is good or not by an evaluation index indicative of good or bad of a general operation arrangement proposal such as passenger dissatisfaction. It is however difficult for the user to confirm whether or not each of diagram changes accumulated for creating an operation arrangement proposal is good. In the case where a number of diagram changes are made at the time of serious disruption or the like, time required to confirm each of the diagram changes also increases.

An object of the present invention is to provide a system and method of realizing increase in speed of operation arrangement work by improving efficiency of not only process of creating an operation arrangement proposal but also process of confirming whether an operation arrangement proposal made by the user is right or not.

The present invention is characterized in that an operation arrangement support system having: an operation arrangement proposal generation part which executes automatic generation of an operation arrangement proposal; a diagram prediction part which executes a simulation of train operation in the future; a diagram display part which displays an operation schedule and the operation arrangement proposal as a diagram; and a user input part which receives input of a parameter from a user is provided with: a snapshot restoration part which restores snapshots of an operation arrangement proposal in an automatic generation process on the basis of a diagram change history outputted by the operation arrangement proposal generation part; and a snapshot display input part which displays to the user a snapshot according to a user input.

Effect of the Invention

According to the present invention, by improving efficiency of a process of confirming an operation arrangement proposal which is automatically generated by a computer, time required to apply the operation arrangement proposal to actual operation can be shortened.

BRIEF DESCRIPTION OF DRAWINGS

FIG. 5 A diagram showing a table configuration of a diagram change history table 1230.

MODE FOR CARRYING OUT THE INVENTION

An embodiment according to the present invention will be described below with reference to FIGS. 1 to 12. The embodiment will be described on assumption that an operation arrangement support system in a railroad operation system is an object to which the invention is applied.

First, the system configuration of the operation arrangement support system according to an embodiment of the present invention will be described with reference to FIG. 1.

Figure 1:
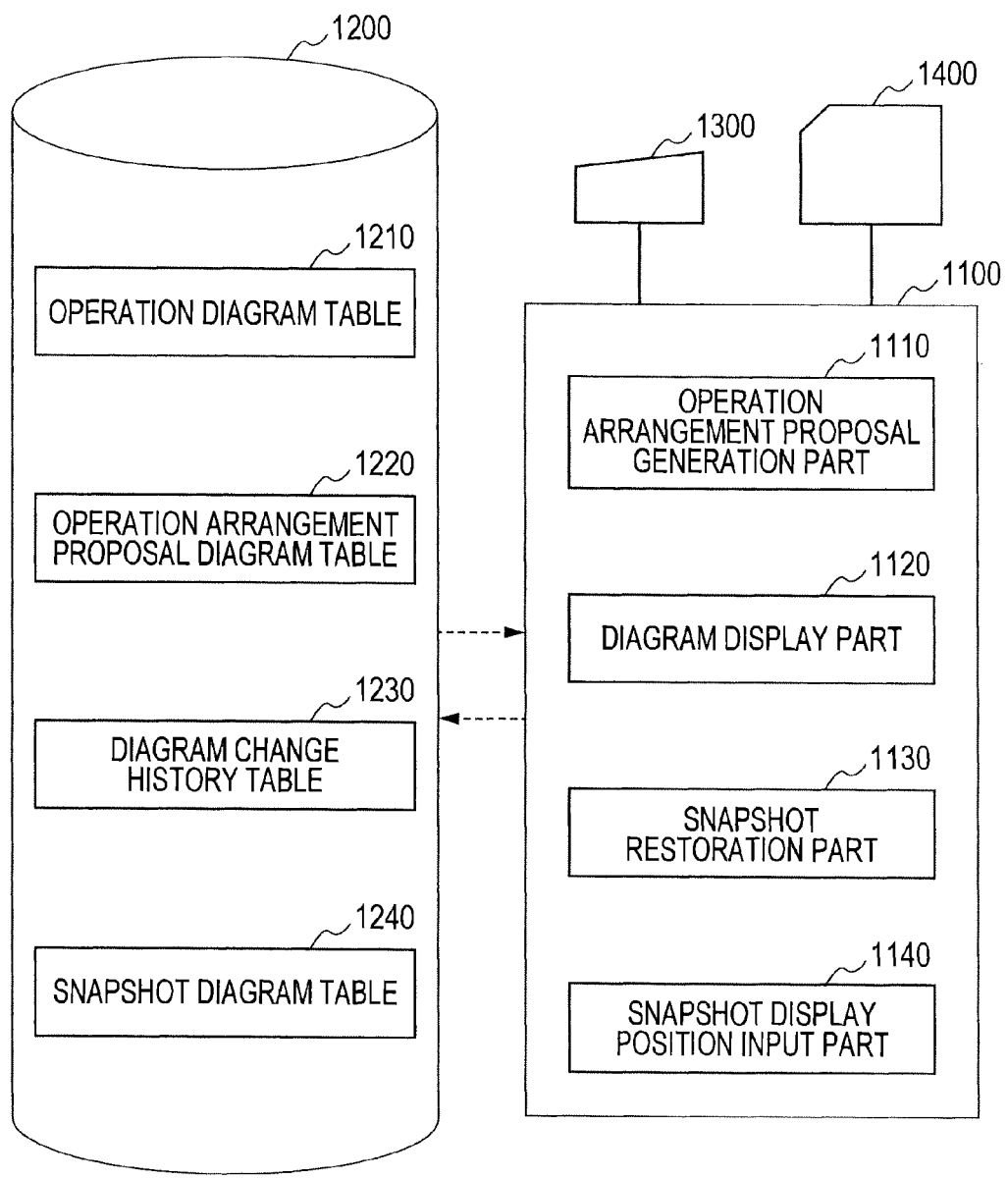
FIG. 1 A system configuration diagram of an operation arrangement support system.
Figure 2:
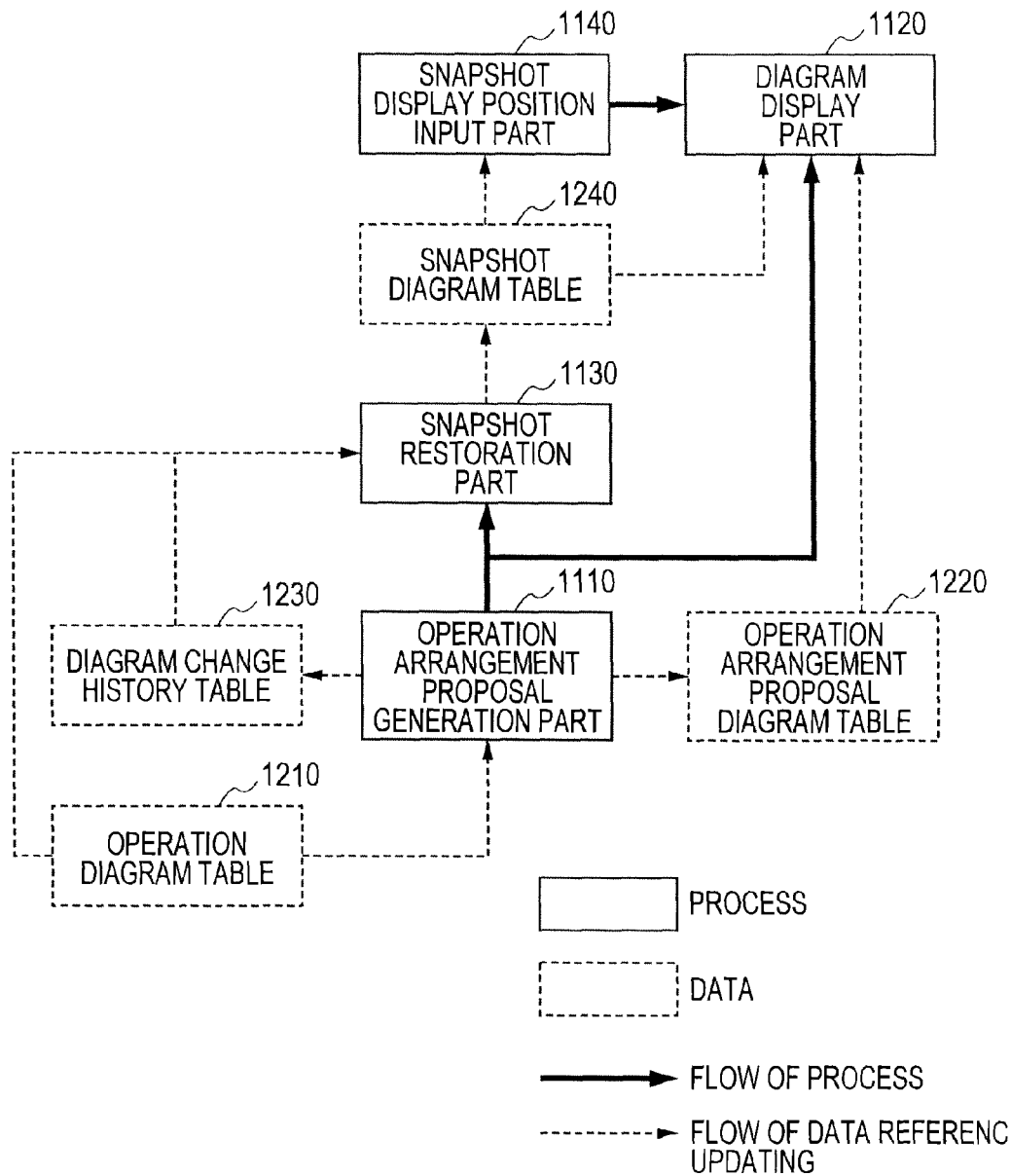
FIG. 2 A diagram showing a process flow of the operation arrangement support system.

FIG. 1 is a system configuration diagram of the operation arrangement support system according to the embodiment of the invention. The operation arrangement system of the embodiment has a configuration of a computer system and includes a central processing unit 1100 for executing a program, a database 1200 for storing data, an input unit 1300 for accepting an input from the user, and a GUI display unit 1400 for displaying various GUIs such as a diagram. The database 1200 is constructed on a storage device such as a hard disk.

The central processing unit 1100 executes, as programs, an operation arrangement proposal generation part 1110 for automatically generating an operation arrangement proposal for restoring a disruption in a train diagram, a diagram display part 1120 for graphically displaying a train diagram, a snapshot restoration part 1130 for restoring a snapshot of the operation arrangement proposal in an operation arrangement proposal automatic generation process performed by the operation arrangement proposal generation part 1110, and a snapshot display position input part 1140 for accepting a designation input of a snapshot which is displayed as a diagram in the diagram display part 1120.

The database 1200 has an operation diagram table 1210 which stores diagram data of an operation schedule obtained by reflecting past travel record in an operation diagram according to plan, an operation arrangement proposal diagram table 1220 which stores diagram data of an operation arrangement proposal generated by the operation arrangement proposal generation part 1110, a diagram change history table 1230 which stores diagram change history executed in the operation arrangement proposal generation, and a snapshot diagram table 1240 which stores diagram data of a snapshot restored by the snapshot restoration part 1130.

The input unit 1300 is an input device for a general computer, such as a mouse or a keyboard.

The display unit 1400 is an output device used in a computer, such as a display.

Next, the flow of processes in the operation arrangement support system will be described. On receipt of an operation arrangement proposal automatic generation request from the user, the operation arrangement proposal generation part 1110 automatically generates an operation arrangement proposal on the basis of diagram data stored in the operation diagram table 1210, stores the generated operation arrangement proposal to the operation arrangement proposal diagram table 1220, and stores a diagram change executed in the operation arrangement proposal generation to the diagram change history table 1230.

Figure 3:
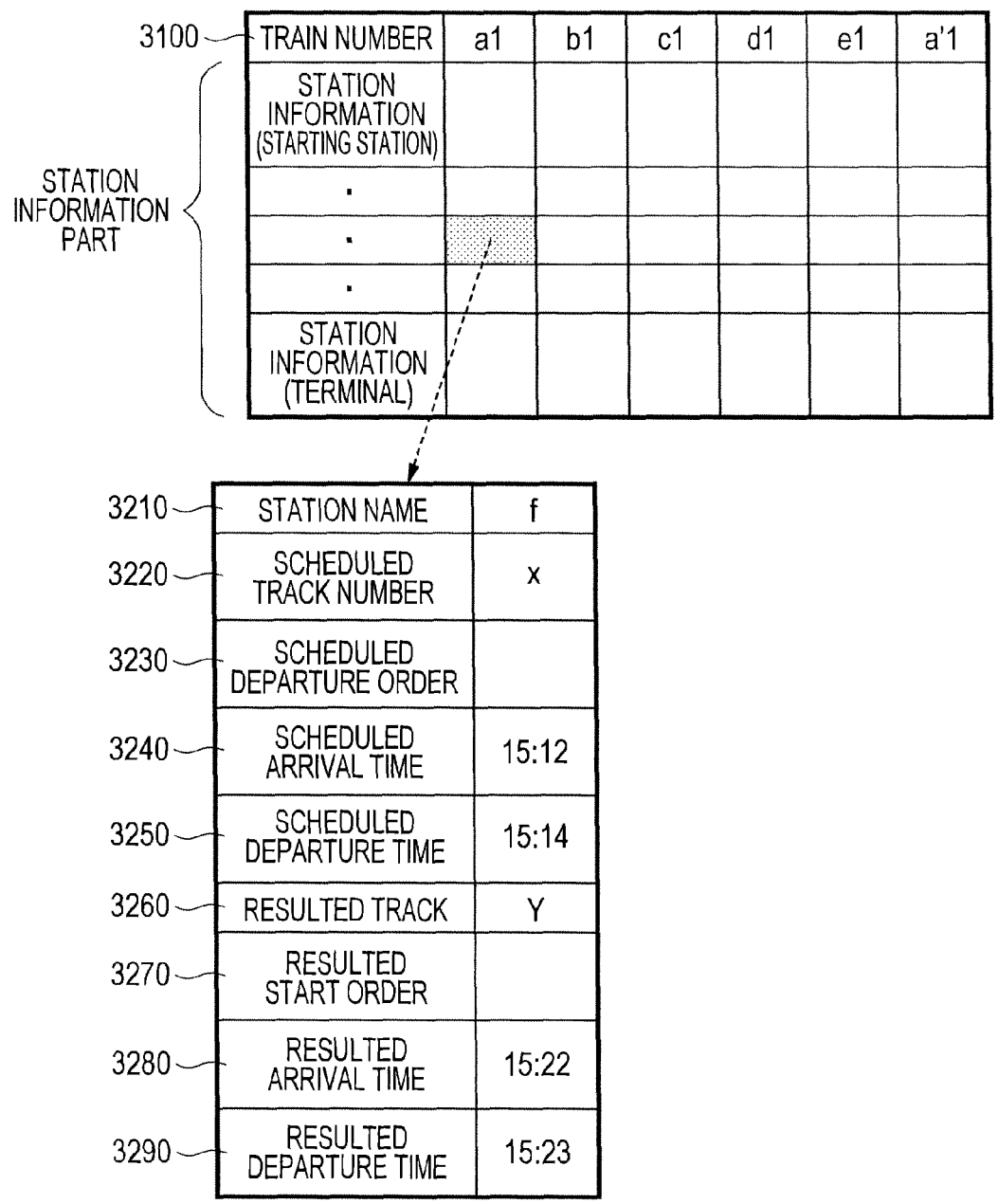
FIG. 3 A diagram showing a table configuration of an operation diagram table 1210.

FIG. 3 is a diagram showing the table configuration of the operation diagram table 1210. The operation diagram table 1210 manages one train as one record and stores a station information part having items on, as items in a record, train number 3100 indicative of unique ID of a train, names of stations the train travels, and departure and arrival time. The station information part manages information of one station (hereinbelow, station information) as one block and has the station information in travel order. Therefore, the station information at the beginning of the station information part is station information on the starting station, and the station information at the end is station information on the terminal station. The station information has items of station name 3210 indicative of the name of the station, a scheduled track number 3220, scheduled departure order 3230, scheduled arrival time 3240, and scheduled departure time 3250 showing a track to be used at the time of planning, departure order, departure time, and arrival time, and resulted track 3260, resulted start order 3270, resulted arrival time 3280, and resulted departure time 3290 showing a track used in an operation record, departure order, departure time, and arrival time.

Figure 4:
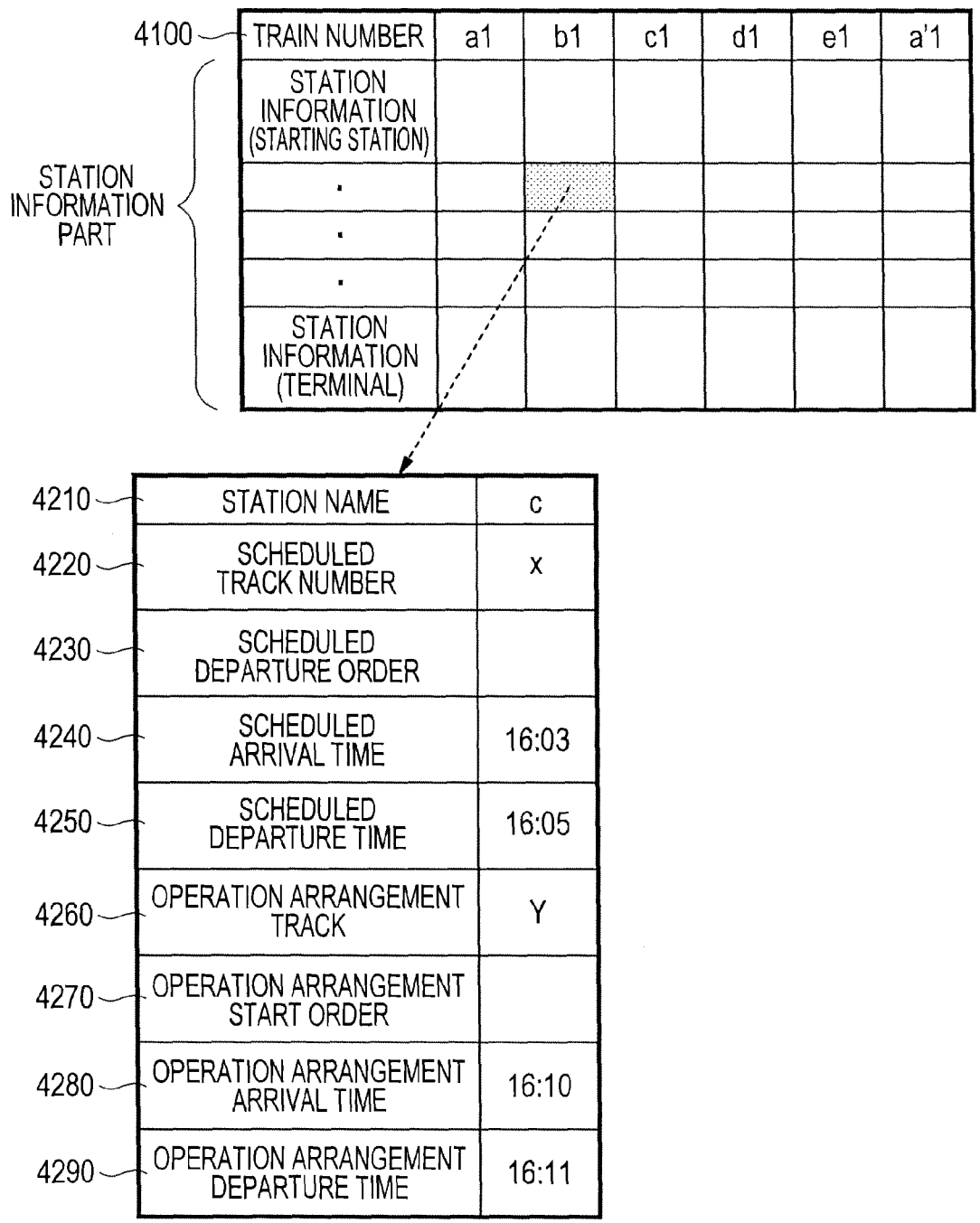
FIG. 4 A diagram showing a table configuration of an operation arrangement proposal diagram table 1220.

FIG. 4 is a diagram showing the table configuration of the operation arrangement proposal diagram table 1220. The operation arrangement proposal diagram table 1220 manages one train as one record like the operation diagram table 1210 of FIG. 1 and stores station information such as train number 4100 indicative of unique ID of a train as items in a record. Like the operation diagram table 1210, the station information includes items of station name 4210, a scheduled track number 4220, scheduled departure order 4230, scheduled arrival time 4240, and scheduled departure time 4250 and has, as items unique to the operation arrangement proposal diagram table, operation arrangement track 4260 and operation arrangement start order 4270 showing a track and departure order in an operation arrangement proposal, and operation arrangement arrival time 4280 and operation arrangement departure time 4290 showing arrival time and departure time of a diagram prediction result for the operation arrangement proposal.

FIG. 5 is a diagram showing the table configuration of the diagram change history table 1230. The diagram change history table 1230 is a table having details of a diagram change which is made to generate the operation arrangement proposal by the operation arrangement proposal generation part 1110 of FIG. 1, and has items of ID 5100 showing peculiar ID on the details of the diagram change, and diagram change details 5200 showing the details of a diagram change.

Referring again to FIG. 2, the description of the process will be continued. On completion of automatic generation of the operation arrangement proposal in the operation arrangement proposal generation part 1110, display of the operation arrangement proposal and snapshot restoration of the operation arrangement proposal in the automatic generation process are executed by the diagram display part 1120 and the snapshot restoration part 1130, respectively.

Figure 6:
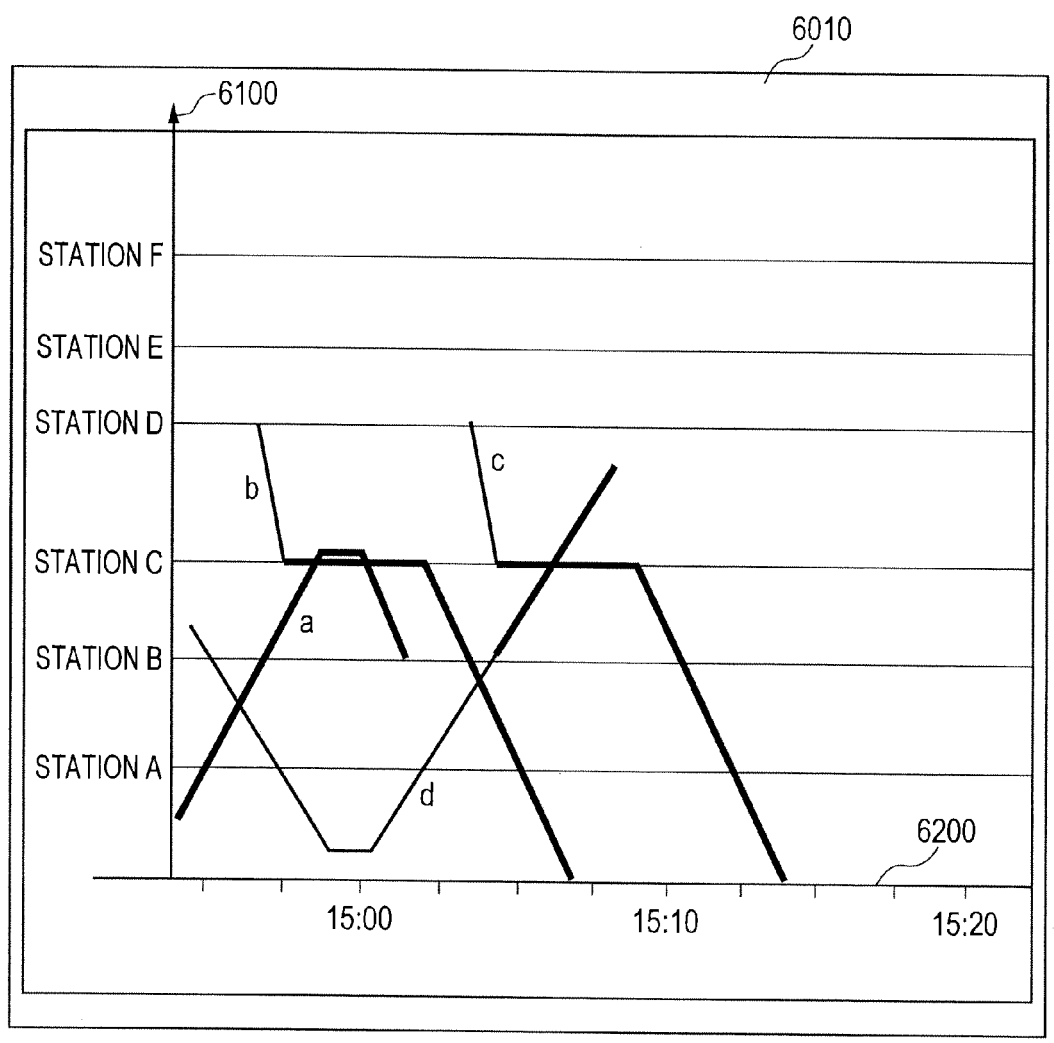
FIG. 6 A diagram.

FIG. 6 is a diagram showing a screen layout which is displayed to the user by the diagram display part 1120. In the diagram displaying a diagram in a diagram display area 6010 which displays a diagram, stations along which a train travels are indicated on the vertical axis 6100, and time is indicated on the horizontal axis 6200. A train diagram is displayed as a two-dimensional graph. A portion displayed by an oblique line on the graph shows that a train is traveling between stations, and a portion indicated by a horizontal line means that a train is stopping at a station. A thick line in the diagram shows that a train is being delayed.

Figure 7:
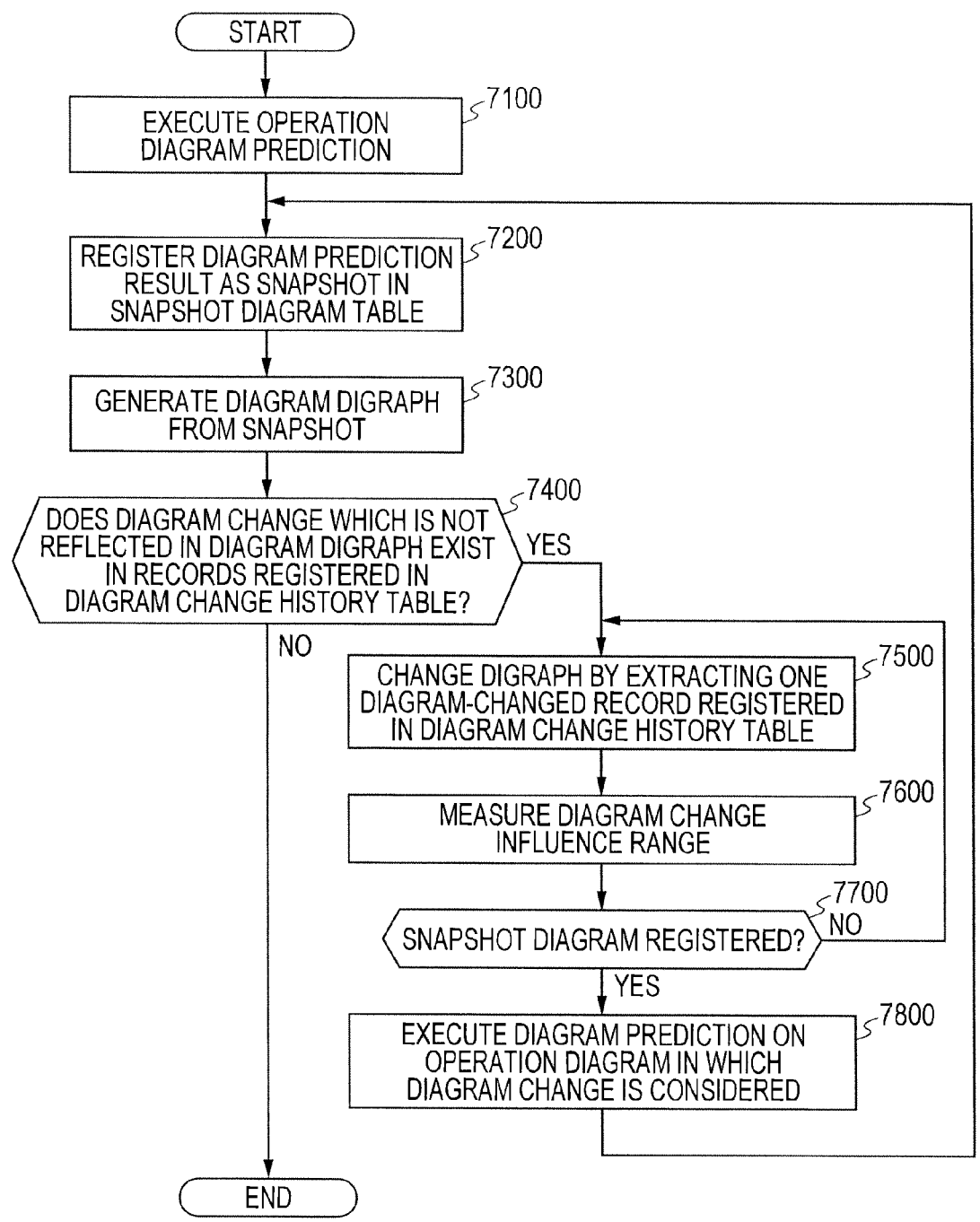
FIG. 7 A diagram showing a process flow of a snapshot restoration part 1130.

FIG. 7 is a diagram showing a process flow of the snapshot restoration part 1130. In step 7100, prediction for an operation diagram is executed, and predicted arrival/departure time in a future part in which an operation record does not exist is calculated. In step 7200, the diagram prediction result is registered in the snapshot diagram table 1240 in FIG. 1.

Figure 8:
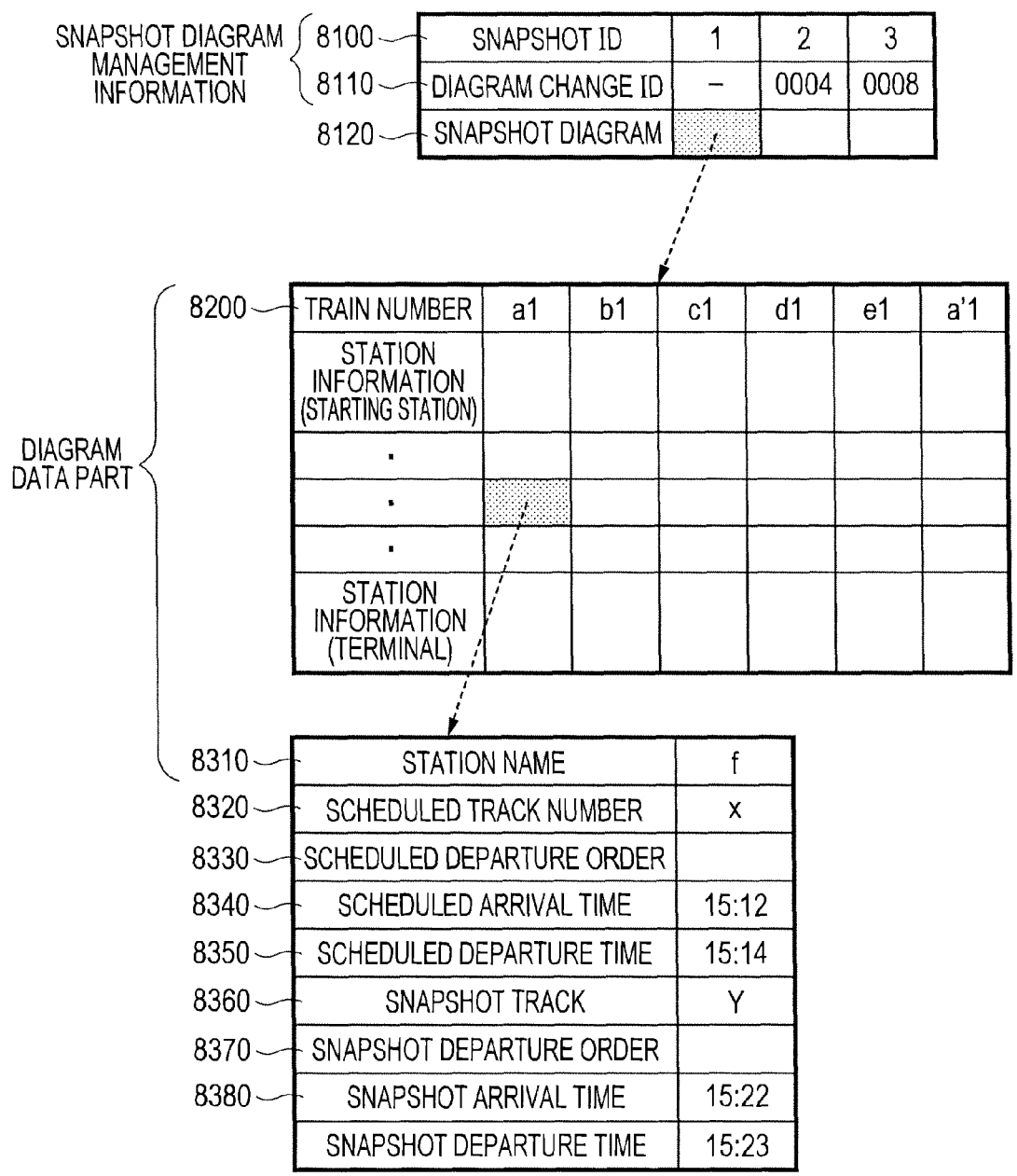
FIG. 8 A diagram showing a table configuration of a snapshot diagram table 1240.

FIG. 8 is a diagram showing the table configuration of the snapshot diagram table 1240. The snapshot diagram table 1240 is divided in a snapshot management information part and a diagram data part. The snapshot management information part has items of snapshot ID 8100 showing peculiar ID of snapshot diagram data, and a diagram change ID 8110 indicative of the ID of a diagram change reflected in a snapshot, in diagram changes stored in the diagram change history table 1230 in FIG. 1. Like the operation diagram table 1210 in FIG. 1 and the operation arrangement proposal diagram table 1220, the diagram data part manages one train as one record and stores, as items in a record, station information such as train number 8200 indicative of unique ID of a train. Like the operation diagram table 1210 and the like, the station information has items of station name 8310, a scheduled track number 8320, scheduled departure order 8330, scheduled arrival time 8340, and scheduled departure time 8350, and has, as items unique to the snapshot diagram table, snapshot track 8360 and snapshot departure order 8370 indicative of a track which is used and departure order in a snapshot of an operation arrangement proposal, and snapshot arrival time 8380 and snapshot departure time 8390 indicative of arrival time and departure time of a diagram prediction result for a snapshot. A snapshot registered first is operation diagram data itself in which no diagram change is reflected. Consequently, 1 is registered as the snapshot ID 8100, an invalid value is registered as the diagram change ID 8110, and a diagram prediction result for the operation diagram is registered as snapshot diagram data.

Referring again to FIG. 7, the description of the process flow of the snapshot restoration part 1130 will be continued. In step 7300, a diagram digraph expressing diagram data registered in the snapshot diagram table 1240 and its prediction result is generated.

Figure 9:
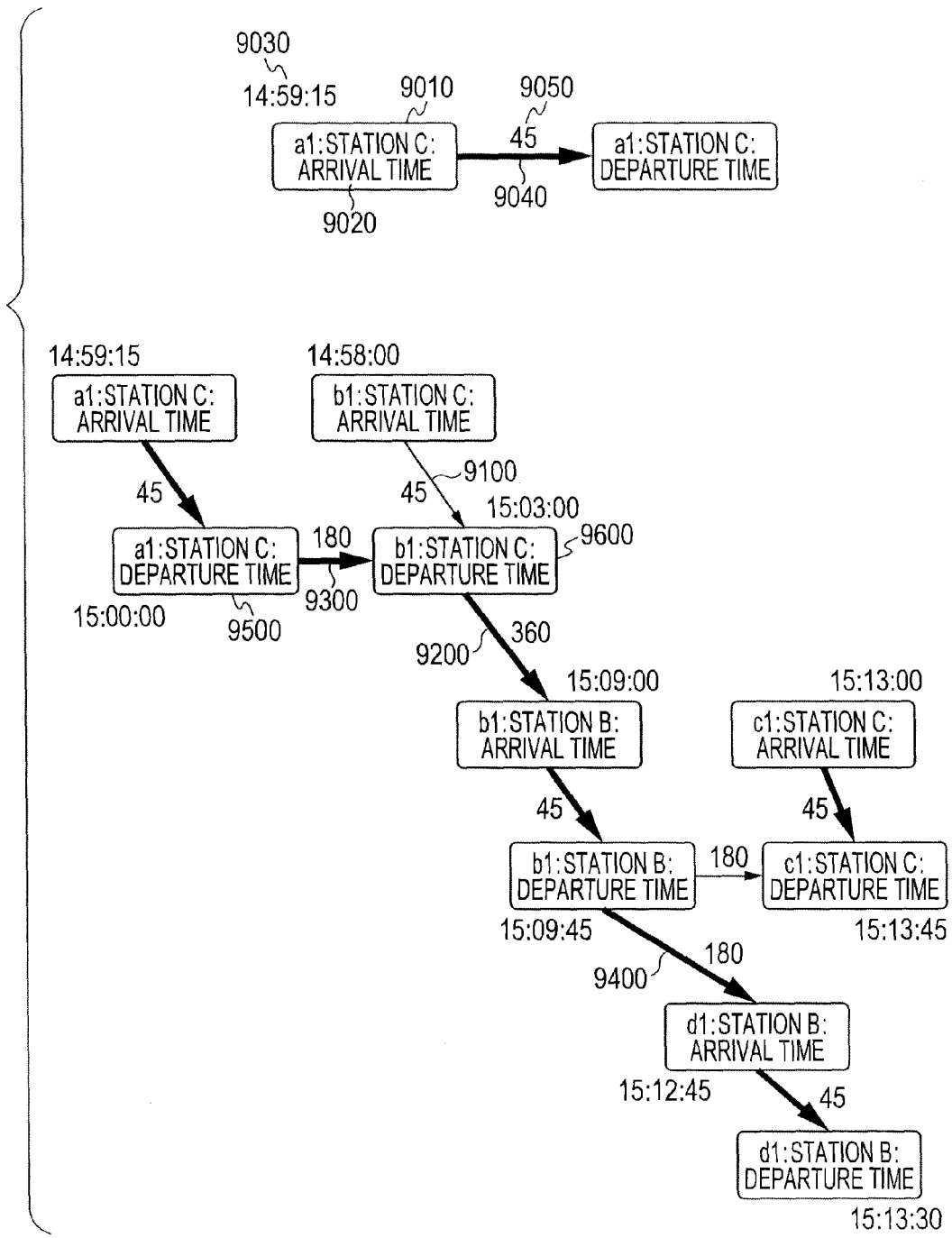
FIG. 9 A diagram showing a diagram digraph.

FIG. 9 is a diagram illustrating a diagram digraph. The diagram digraph is a digraph expressing diagram data showing departure time and arrival time of diagram data as nodes, departure/arrival times in a diagram prediction result as values of the nodes, a constraint condition related to time calculation existing between nodes as a branch, a label of the branch as a time difference to be assured between times of the nodes coupled to each other via the branch, and a direction from an earlier node to a later node as the direction of the branch. A quadrangle frame in the diagram expresses a node 9010, characters written in the quadrangle frame expresses an attribute 9020 of the node, time written on the outside of the quadrangle is value 9030 of the node, an arrow indicates a branch 9040, and numeral written on the side of the arrow expresses label 9050. The branches include a train stop time constraint branch 9100 extended between nodes indicative of departure/arrival times of the same train in the same station, an inter-station travel time constraint branch 9200 extended between the departure time node of the same train and an arrival time node of the next station in the travel direction, a departure interval constraint branch 9300 extended between departure time nodes of trains departing successively from the same station, and a track competition constraint branch 9400 extended between the arrival time node and the departure time node of two trains using the same track. Although not shown, there are also an arriving-train interval branch extended between arrival time nodes of two trains arriving at the same station in the same direction, an intersection hindrance constraint branch extended between arrival/departure time nodes of two trains traveling at a level intersection, and a shuttle time constraint branch extended between a last arrival time node and a first departing time node of two shuttle trains. The branches have values of different labels. For example, the label of the train stop time constraint branch 9100 is 45 indicative of the minimum stop time, and the label of the inter-station travel time constraint branch 9200 is 360 indicative of the minimum travel time. A branch having a value obtained by adding the value of a node from which the branch extends and the label of the branch, the value being the same as the value of a node to which the branch is coupled is set as a constraint propagation branch, and the branch is expressed by a thick line in the diagram like the branch 9200.

Referring again to FIG. 7, the description of the process flow of the snapshot restoration part 1130 will be continued. In step 7400, whether or not a diagram change which is not reflected in the diagram digraph exists in diagram changes registered in the diagram change history table 1230 shown in FIG. 1 is determined. When all of diagram changes are reflected, the process of the snapshot restoration part 1130 is finished. When there is a diagram change which is not reflected, the process advances to step 7500. In step 7500, a diagram change described in the diagram change history, of one record is extracted in accordance with the order of operation arrangement generating processes, and the diagram digraph is deformed on the basis of the diagram change. In the following description, it is assumed that, as an example, the diagram change of "change of departure order of b1 to order before a1 at station C" indicated by record 5310 in FIG. 5 is extracted in step 7500.

Figure 10:
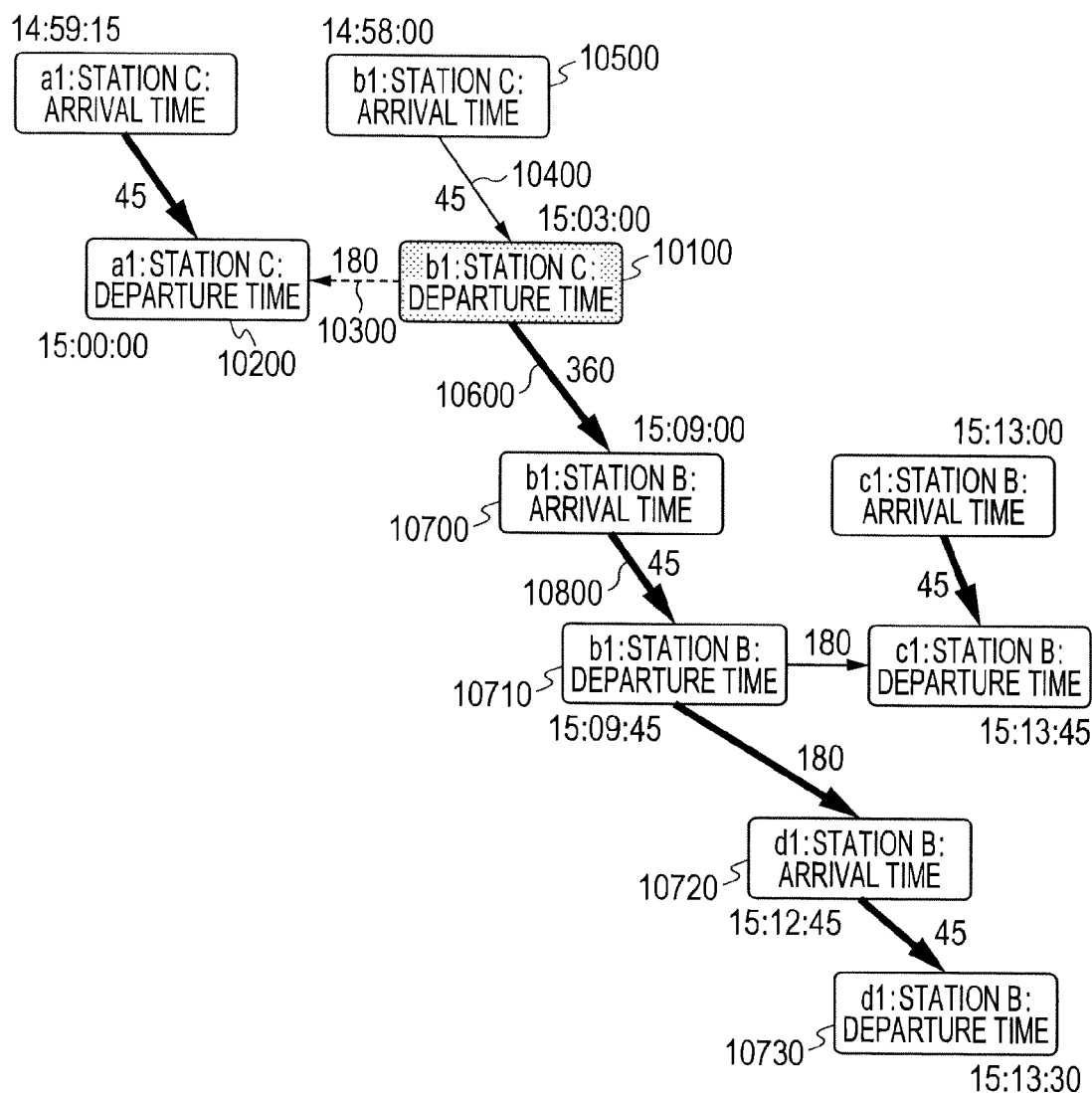
FIG. 10 A diagram showing a diagram digraph.

FIG. 10 is a diagram showing a diagram digraph deformed on the basis of the process of step 7500. The diagram digraph before the deformation is as shown in FIG. 9, and the diagram change as the base of the deformation is the above-described "change of departure order of b1 to order before a1 at station C". In FIG. 9 as the diagram digraph before the deformation, the departure interval constraint branch 9300 indicative of the departing order constraint of a1 and b1, which is extended from the node 9500 showing the departure time of a1 at station C and coupled to the node 9600 showing the departure time of b1 at station C, is deformed. In FIG. 10 as the diagram digraph after the deformation, the direction of a branch 10300 indicative of the departure order constraint of a1 and b1 is reversed so that a node 10100 showing the departure time of b1 at station C becomes a node from which the branch is extended, and a node 10200 showing the departure time of a1 at station C becomes a node to which the branch is coupled. At the time point of step 7500 in FIG. 7, only a branch is deformed, and the value of a node is not changed. Consequently, a state where inconsistency occurs in the relation between the branch indicative of the constraint and the node value is temporarily maintained.

Referring again to FIG. 7, the description of the process flow of the snapshot restoration part 1130 will be continued. In step 7600, the range of the influence exerted by the diagram change is measured by the number of nodes in which a value is changed by the change in the diagram digraph in step 7500.

Figure 11:
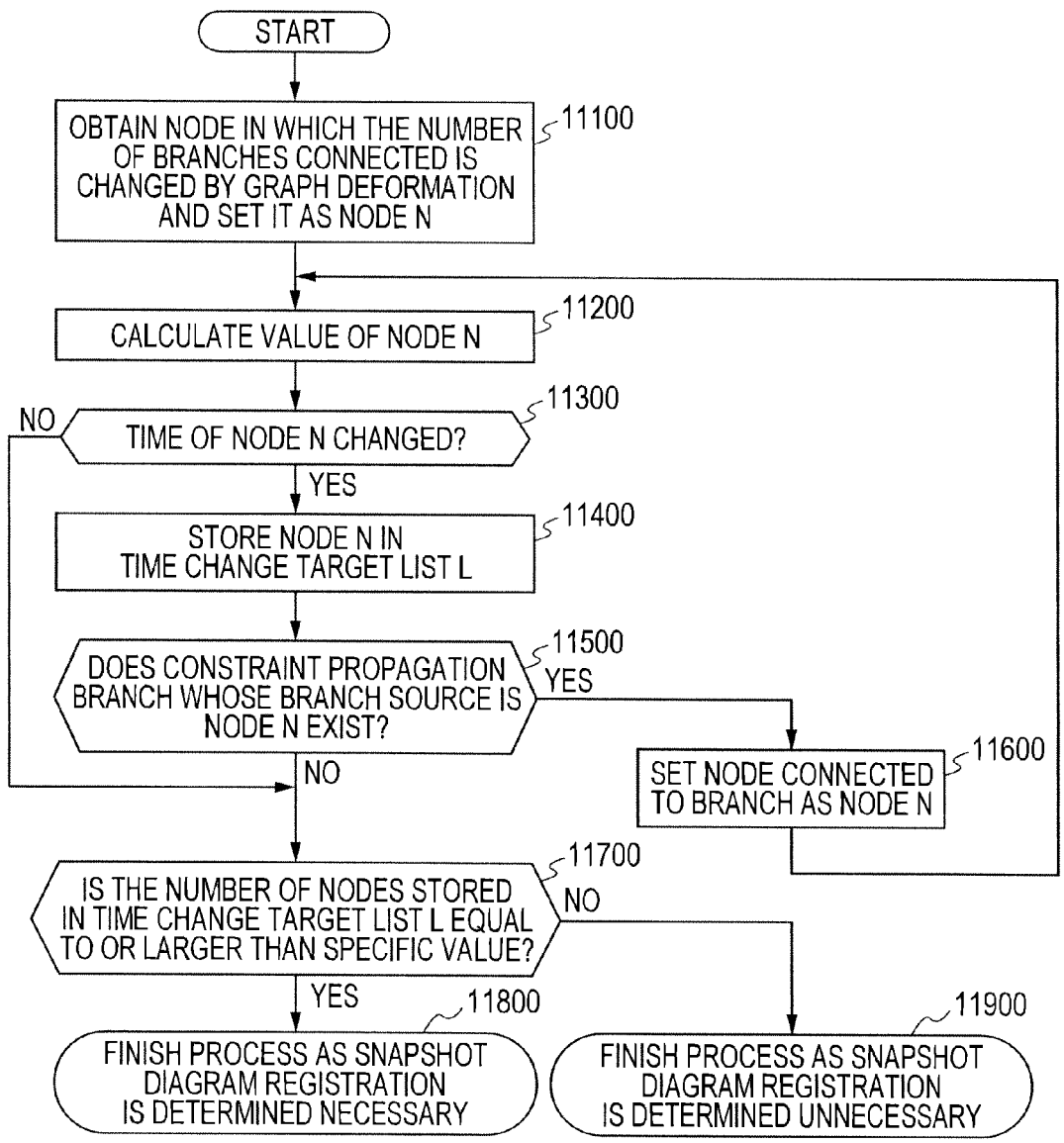
FIG. 11 A diagram showing a process flow of partial diagram change influence range measurement of the process of the snapshot restoration part 1130.

FIG. 11 is a diagram showing a process flow of the diagram change influence range measurement. In step 11100, a node in which the number of branches connected as branches from which the node extends decreases as compared with the deformation is obtained by the graph deformation executed in step 7500 in FIG. 7, and is set as a node N to be processed. In FIG. 10, the number of branches extended to the node 10100 changes from two in FIG. 9 before deformation of the graph to one, so that the node 10100 is set as the node N. In step 11200, the value of the node N is calculated. The value of the node N is calculated by the following mathematical formula (a).

$$\text{Value (Node}N) = \text{Max}(\forall b : \text{label}(b) + \text{Value (Node}(b, \text{Base}))) \quad (a)$$

Value (NodeN): the value of the node N
Max ($\forall$i:f(i)): the maximum value of f(i) when f(i) is executed on all of i that apply
b: branches to which the node N is connected
label (b): label of branch
Node (b, Base): node from which the branch b is extended In the diagram digraph of FIG. 10, the branch extended to the node 10100 as the node N is only the branch 10400, so that the value of the node N is calculated as 14:58:45 obtained by adding the label value 45 (seconds) of the branch 10400 and the value (14:58:00) of the node (10500) as the branch source.

Referring again to FIG. 11, the description of the process flow of the diagram change influence range measurement will be continued. In step 11300, the value of the node calculated in step 11200 is compared with the value of the node before calculation. When there is a change in the value of the node, the program advances to step 11400. When there is no change, the program advances to step 11700. In the embodiment, the value before calculation of the node N is 15:03:00 in FIG. 10 and the value calculated in step 11200 is 14:58:45, so that there is a change in the value of the node N, and the program advances to step 11400.

In step 11400, the node N is stored as a node influenced by the diagram change into a time change target list L. In step 11500, whether a constraint propagation branch whose branch source is node N exists or not is determined. When there is a constraint propagation branch, the program advances to step 11600. When there is no such branch, the program advances to step 11700. In the embodiment, the branch 10600 whose branch source is the node 10100 is the constraint propagation branch shown by a thick line in FIG. 10. Consequently, it is determined in step 11500 that there is a constraint propagation branch, and the program advances to step 11600 in FIG. 11. In step 11600, the node to which the constraint propagation branch whose existence is confirmed in step 11500 is connected is set as the node N. After that, the program returns to the process in step 11200. In the embodiment, the node 10700 in FIG. 10 is set as the node N, and the program advances to step 11200 in FIG. 11. Hereinafter, as the process advances, nodes 10710, 10720, and 10730 in FIG. 10 become nodes N which are stored in the time change target list L in step 11400 in FIG. 11, the process in step 11500 on the node 10730 is executed and, after that, the program advances to step 11700. In step 11700, whether the number of nodes stored in the time change target list L is equal to or larger than a specific value is determined. When the number of nodes is equal to or larger than the specific value, the program advances to step 11800. When the number of nodes is less than the specific value, the program advances to step 11900. The specific value is a value which can be arbitrarily set by the user. In step 11800, it is determined that snapshot registration is necessary, and the diagram change influence range measuring process is finished. In step 11900, it is determined that the snapshot registration is unnecessary, and the process is finished.

Referring again to FIG. 7, the description of the process flow of the snapshot restoration part 1130 will be continued. In step 7700, whether the snapshot registration becomes necessary in the process of step 7600 or not is determined. When the snapshot registration becomes necessary, the program advances to step 7800. When the snapshot registration becomes unnecessary, the program advances to step 7500. In step 7800, diagram prediction is executed on the operation diagram to which the diagram change extracted in step 7500 is added. After that, the program advances to step 7200. In the embodiment, the diagram prediction is executed on the diagram data obtained by reflecting the diagram change in the record 5310 in FIG. 5 in the operation diagram. In the case where the snapshot registration is unnecessary, the program advances to step 7500. In step 7500, the diagram change shown in a record 5320 in FIG. 5 is extracted, and the digraph in which the diagram change in the record 5310 is reflected is deformed by adding the diagram change in the record 5320. After that, the program advances to step 7600.

Referring again to FIG. 2, the description of the process will be continued. When the user executes an operation of inputting data to the snapshot display position input unit 1120, a snapshot according to the input data is displayed as a diagram on the diagram display part 1120.

Figure 12:
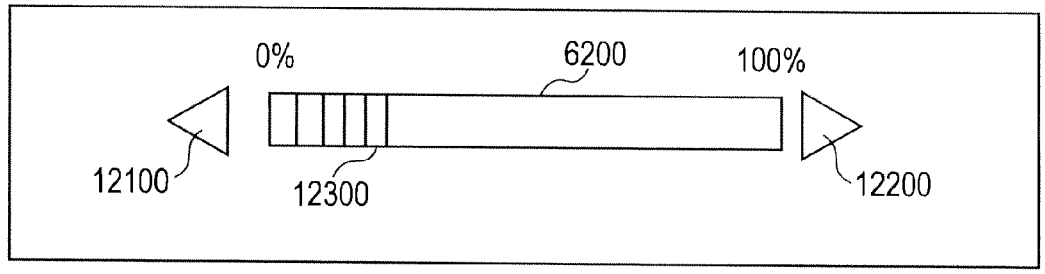
FIG. 12 A snapshot display position input part 1140.

FIG. 12 is a diagram showing a GUI in the snapshot display position input part 1140. The GUI has a review button 12100 instructing display of a snapshot in the past direction from a snapshot being displayed, a fast-forward button 12200 instructing display of a snapshot in the future direction, and a progress bar 12300 instructing a snapshot to be displayed by designation of the percentage when the number of all of snapshots is 100. Diagram data of a snapshot having snapshot ID to be displayed is obtained from snapshot data stored in the snapshot diagram table 1240 in FIG. 1 on the basis of the ID of the snapshot being displayed and input data, and a snapshot is displayed in the diagram display part 1120 in FIG. 1.

By the above process, the flow of the series of processes in the embodiment is finished.

DESCRIPTION OF REFERENCE NUMERALS

1100 . . . Central processing unit
1200 . . . Database
1300 . . . Input unit
1400 . . . Display unit
1110 . . . Operation arrangement proposal generation part
1120 . . . Diagram display part
1130 . . . Snapshot restoration part
1140 . . . Snapshot display position input part
1210 . . . Operation diagram table
1220 . . . Operation arrangement proposal diagram table
1230 . . . Diagram change history table
1240 . . . Snapshot diagram table

What is claimed is:

1. An operation arrangement support apparatus comprising:
   a processor including an operation arrangement proposal generation part configured to execute generation of an operation arrangement proposal;
   a display position input part configured to receive a user input information which designates a snapshot on the way of the operation arrangement proposal generated by the operation proposal generation part; and
   an output part configured to output the snapshot according to the input information received by the display position input part after the operation arrangement proposal.

2. The operation arrangement support apparatus according claim 1,
   further comprising a database including a storage part configured to store a plurality of the snapshots which are generated;
   wherein the output part outputs the snapshot according to the input information out of a plurality of the snapshots which are stored in the storage part.

3. The operation arrangement support apparatus according claim 2, wherein the output part further outputs a snapshot display position input part to receive the input information.

4. The operation arrangement support apparatus according claim 3,
   wherein the output part outputs displaying a review button instructing display of a snapshot in the past direction from a snapshot being displayed and a fast-forward button instructing display of a snapshot in the future direction from a snapshot being displayed and a progress bar instructing a snapshot to be displayed by designation of the percentage when the number of all of snapshots is 100 which are stored in the storage part;
   wherein the display position input part receives the input information.

5. An operation arrangement support system comprising:
   a processor including an operation arrangement support apparatus having an operation arrangement proposal generation part configured to execute generation of an operation arrangement proposal and a display position input part configured to receive a user input information which designates a snapshot on the way of the operation arrangement proposal generated by the operation proposal generation part and an output part configured to output the snapshot according to the input information received by the display position input part after the operation arrangement proposal, and
   a display displaying the snapshot.

6. An operation arrangement support method comprising;
executing, via an operation arrangement proposal generation part included in the processor, automatic generation of an operation arrangement proposal;
receiving, via a display position input part included in the processor, a user input information which designates a snapshot on the way of the operation arrangement proposal generated automatically;
outputting, via an output part included in the processor, the snapshot according to the input information received by the display position input part after the operation arrangement proposal.

7. The operation arrangement support method according claim 6,
storing a plurality of snapshots generated automatically via the storage part included in the processor;
outputting the snapshot according to the input information out of a plurality of the snapshots which are stored in the storage part, via the output part.

8. The operation arrangement support method according claim 7,
further outputting a snapshot display position input part to receive the input information via the output part.

9. The operation arrangement support method according claim 8,
outputting, displaying as the snapshot display position input part, a review button instructing display of a snapshot in the past direction from a snapshot being displayed and a fast-forward button instructing display of a snapshot in the future direction from a snapshot being displayed and a progress bar instructing a snapshot to be displayed by designation of the percentage when the number of all of snapshots is 100 which are stored in the storage part;
receiving the input information via the display position input part.

* * * * *